United States Patent [19]
Mattheis

[11] Patent Number: 6,141,774
[45] Date of Patent: Oct. 31, 2000

[54] PERIPHERAL DEVICE WITH ACCESS CONTROL

[75] Inventor: Karl-Heinz Mattheis, San Jose, Calif.

[73] Assignee: Infineon Technologies North America Corp., San Jose, Calif.

[21] Appl. No.: 09/062,382

[22] Filed: Apr. 17, 1998

[51] Int. Cl.[7] .................................................. G06F 11/00
[52] U.S. Cl. ............................................ 714/27; 713/202
[58] Field of Search .................................. 713/200, 201, 713/202; 714/27, 30, 31, 32, 39, 43, 44; 380/3, 4, 23, 25; 711/164, 163

[56] References Cited

U.S. PATENT DOCUMENTS

| | | | |
|---|---|---|---|
| 4,586,179 | 4/1986 | Sirazi et al. | 371/12 |
| 4,594,685 | 6/1986 | Owens | 364/900 |
| 5,073,853 | 12/1991 | Johnson | 395/575 |
| 5,355,414 | 10/1994 | Hale et al. | 380/25 |
| 5,421,006 | 5/1995 | Jablon et al. | 395/575 |
| 5,450,576 | 9/1995 | Kennedy | 395/650 |
| 5,469,564 | 11/1995 | Junya | 395/188.01 |
| 5,513,319 | 4/1996 | Finch et al. | 395/188.08 |
| 5,522,086 | 5/1996 | Burton et al. | 395/829 |
| 5,537,544 | 7/1996 | Morisawa et al. | 395/188.01 |
| 5,541,943 | 7/1996 | Niescier et al. | 371/62 |
| 5,594,865 | 1/1997 | Saitoh | 395/185.08 |
| 5,844,497 | 12/1998 | Gray | 340/825.34 |
| 5,845,066 | 12/1998 | Fukuzumi | 395/186 |
| 5,931,948 | 8/1999 | Morisawa et al. | 713/202 |

FOREIGN PATENT DOCUMENTS 37 28 561   3/1989   Germany .

*Primary Examiner*—Nadeem Iqbal

[57] ABSTRACT

An integrated peripheral device comprises an associated register. The register comprises a data area containing a password. The register is connected to a read/write control unit, which generates an enabling signal after a first access which allows a data word to be written to the register during a following second write access. The read/write control unit comprises a comparator which compares data transmitted to the peripheral device during a first access with the password and generates a comparison signal, the read/write control unit only generates the enabling signal if the comparator generates a predefined comparison signal, for example, an equality signal.

29 Claims, 6 Drawing Sheets

PERIPHERAL DEVICE WITH ACCESS CONTROL

BACKGROUND OF THE INVENTION

The present invention relates to a peripheral device with access control and, in particular, to a programmed digital data processing system including a watchdog timer. The microcontroller is generally equipped with a plurality of peripheral devices. Some of these devices control important functional systems of the digital data processing system. These important functional systems can be, for example, a watchdog timer, an interrupt controller, a coprocessor, etc. These peripheral devices should work properly at all times. Therefore, access to registers which are associated with these peripheral devices are restricted.

Different access control systems are known in the art. For example, U.S. Pat. No. 5,073,853 discloses a data processing system including a microcomputer. This microcomputer is provided with a watchdog arrangement comprising a clock counter and an output which is coupled to a reset input of the microcomputer. In order to increase the number of malfunctions to which the watchdog responds, the microcomputer is arranged to repeatedly generate reset signals. These reset signals are in the form of a complete byte X or Y which alternate. These two bytes are applied to an input of a comparator which compares them with identical bytes fed to a further input. The watchdog arrangement is reset only if the bytes fed to the further input are identical to either byte X or Y. This arrangement prevents the watchdog timer from being reset accidentally. Therefore, U.S. Pat. No. 5,073,853 does not provide a completely secure system.

SUMMARY OF THE INVENTION

It is therefore an object of the invention to provide a peripheral device with access control that does not have the limitations of the state of the art. This object is achieved by an integrated peripheral device having an associated control register. This control register comprises a data area containing a password. A read/write control unit is provided, which is connected to the control register and which generates an enabling signal after a first access allowing a data word to be written to the control register during a following second write access. The read/write control unit comprises a comparator which compares data transmitted to the peripheral device during a first access with the password and generates a comparison signal. The enabling signal is only generated if the comparator generates a predefined comparison signal, e.g. a equality signal.

A further object of the present invention is to provide a method of accessing an integrated peripheral device with a high security system against unintentional access. This object is achieved by a method of accessing an integrated peripheral device with an associated control register. The control register includes a data area containing a password. This control register is connected to a read/write control unit which generates an enabling signal of a first access and which allows a data word to be written to the control register during a following second write access. The method comprises the steps of:

(a) writing a first data word comprising at least said password to said peripheral device,
 (b) said read/write unit comparing said password of said first data word with said stored password, and generating an enabling signal if said passwords meet a predefined condition,
 (c) writing a second data word into said peripheral device, and
 (d) storing said second data word in said register if said enabling signal has been generated.

One of the main aspects of the present invention is to provide a dynamic access control. In other words, the password can be changed at any time. Thus, it is ensured that malfunctioning due to, for example, a virus program, can be prevented by causing a reset of the microcontroller.

DESCRIPTION OF THE PREFERRED EMBODIMENTS

The peripheral device can be any integrated device connected to the central processing unit of, for example, a microcontroller. In the preferred embodiments, the peripheral device is a watchdog timer but can be any other device. To allow recovery from software or hardware failure, a watchdog timer is provided in an integrated microcontroller or connected to a data processor. If the software fails to service this timer correctly, a watchdog timer error signal will be activated. This signal can be used to perform a complete reset of the entire chip. Depending on the implementation of the various derivatives, this signal can also be used to activate a dedicated output pin or to generate an interrupt request instead of a reset.

While the software is designed to always service the watchdog timer before it overflows, a time out of the watchdog timer will occur if the program does not progress properly. The watchdog timer will also time out if the software error was due to hardware related failures. This prevents the controller from malfunctioning for longer than a user-specified time. The service of such a peripheral device is a critical system function, since unintentional service due to an error condition could disable the watchdog function. Thus, a watchdog service designed according to the present invention requires a special instruction sequence with a password mechanism in order to become effective. According to the present invention, an incorrect sequence will also lead to the above mentioned signal which can generate a reset signal. Thus, for example, a virus program can be blocked from deactivating the watchdog timer.

Figure 1:
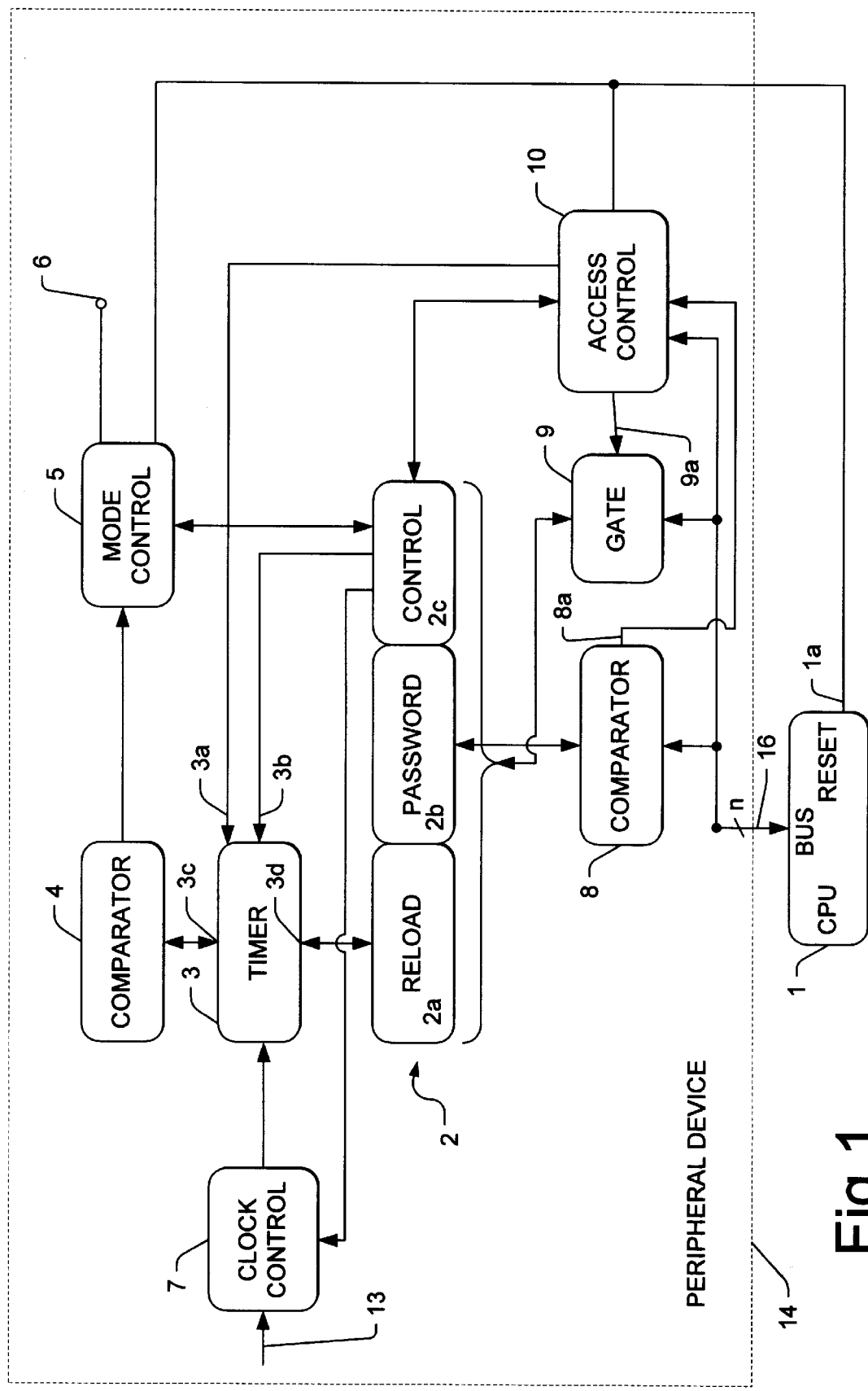
FIG. 1 shows a block diagram of a first preferred embodiment according to the present invention.

FIG. 1 shows a first embodiment comprising a central processing unit (CPU) having a reset input 1*a* and an interface bus 1*b* with a plurality of n bus lines. The CPU 1 is coupled to a peripheral device 14. Peripheral device 14 contains, for example, control register 2, timer 3, comparator 4, mode control 5, clock control 7, comparator 8, gate 9, and access control 10. The bus lines 1*b* are connected to a first input of a comparator 8. The bus lines 1*b* are also connected to first input/output terminals of a controllable gate 9. Finally, the bus lines 1*b* are connected to an access control unit 10. A control register 2 is provided which comprises several bit fields. A first bit field 2*a* contains a reload value, a second bit field 2*b* contains a password and a third bit field 2*c* contains a plurality of control bits. Bit field 2*b* containing the password is connected to the second input of comparator 8. Comparator 8 has an output terminal 8*a* which carries a signal which is generated if the two input signals are identical. This output terminal 8*a* of comparator 8 is connected to a further input of the access control unit 10. Access control unit 10 is further connected to the control bit field 2*c*. Access control unit 10 generates an output signal 9*a* which is fed to the control input of the controllable gate 9. It also generates a further signal which is fed to reset input 3*a* of a timer 3. The second input/output terminals of controllable gate 9 are connected to the control register 2.

To control the different functions of the peripheral device, several bits of the reload bit field 2*a* are coupled to timer 3. A plurality of control bits from the control bit field 2*c* are therefore coupled to control inputs 3*b* of timer 3 to control its functions. Further control lines of the control bit field 2*c* are connected to a clock control unit 7. A first clock signal 13 is fed to clock control unit 7 which outputs a second clock signal fed to timer 3. A second comparator 4 is provided which compares the content of timer 3 with 0 and generates an output signal if the timer value of timer 3 is equal to 0. This signal is fed to a mode control unit 5 which is also controlled by, for example, one bit of bit field 2*c*. The mode control unit 5 generates a first output signal which is accessible at terminal 6 and a second output signal which is fed to the reset input 1*a* of CPU 1.

A read access from the CPU 1 to the watchdog timer control register 2 can be performed without any restrictions except, for example, if the password in bit field 2*b* is unreadable. A respective signal is sent via bus 1*b* to access control unit 10 which then activates gate 9. The content of control register 2 is then accessible by the CPU 1. However, write accesses to control register 2 can be protected in two ways. They can only be performed on a supervisor level which indicates that the CPU 1 has access to a certain address range in which the peripheral device 14 is addressable. In addition, a special password lock/unlock mechanism according to the invention is provided. In order to change bits in the control register 2, first a password must be written to the address of the control register 2. This password is located in bit field 2*b* of the respective word written to control register 2. Comparator 8 compares these two passwords and generates a comparison signal, for example, checks equality of the passwords, which is fed to access control unit 10. Then, access control unit 10 generates a signal which is fed into the control input 9*a* of gate 9 which opens the access to control register 2 for modifications. A following instruction can then change parameters in control register 2 including the password located in bit field 2*b*. After this second access to control register 2, this register 2 will automatically be closed for modifications again and the new parameters will be in effect.

Any attempt to write to control register 2 with a wrong password in a wrong sequence, will result in a reset signal generated by access control unit 10 which is coupled to reset input 1*a* of CPU 1. The control bit field 2*c* contains a bit which reflects this type of watchdog reset. Preferably, when the microcontroller is turned on for the first time, the password contained in bit field 2*b* is automatically set to "0" to have a defined content.

In a further embodiment, a second security mechanism is provided. A special toggle bit is provided in the control bit field 2*c*. With the first access to control register 2 with the password contained in bit field 2*b*, this toggle bit has to be written to "0". With the second access, this bit must be written to "1". In another embodiment, the first value can be "1" and the second value then must be "0". However, the purpose of this bit is to require two accesses to control register 2, even if the other parameters are not changed. If this bit is written to zero with the second access to control register 2, a reset signal will be generated by access control unit 10 and fed to reset input 1*a* of CPU 1.

Figure 2:
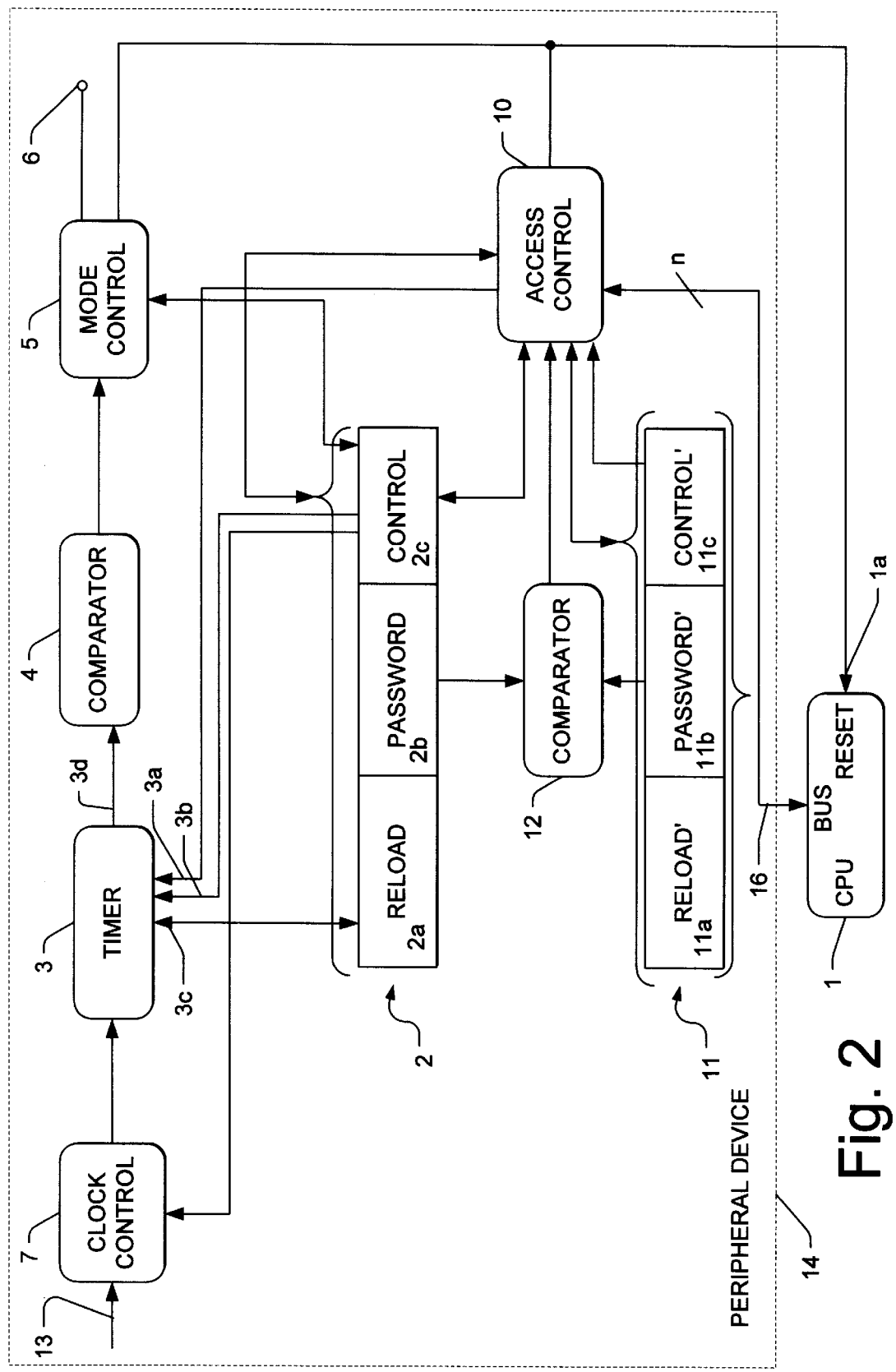
FIG. 2 shows a block diagram of a second preferred embodiment according to the present invention.

FIG. 2 shows a second preferred embodiment according to the present invention. The same numerals from FIG. 1 indicate the same elements in FIG. 2. Instead of comparator 8 and gate 9 according to FIG. 1, in this embodiment, a shadow register 11 and a comparator 12 are provided. The interface bus lines 1*b* are connected to register 11. Register 11 comprises several bit fields. A first bit field 11*a* contains a reload value, a second bit field 11*b* contains a password, and a third bit field 11*c* contains a plurality of control bits. The first input of comparator 12 is connected to bit field 11*b* of register 11, and the second input of comparator 12 is connected to bit field 2*b* of control register 2*c*. Access control unit 10 contains means to write the content of shadow register 11 into control register 2*c*. Therefore, shadow register 11 and control register 2 are connected to access control unit 10.

The function of the embodiment shown in FIG. 2 is substantially the same as the one described above in FIG. 1. During a first access to the peripheral device 14, in this example the watchdog timer, CPU 1 writes a password into shadow register 11 which is compared by comparator 12 with the password contained in control register 2. If both passwords are identical, comparator 12 generates a signal which is fed to access control unit 10. During a second access, CPU 1 writes, for example, a new register content, including a new password, into shadow register 11. This new register content is transferred in parallel or with a time delay by the writing means in access control unit 10 to the control register 2. In another embodiment according to the above description, a toggle bit of the control bit field 11*c* can be used to further enhance security. During a first access, this toggle bit must be written to "0," and then written to "1" with the second access to shadow register 11. Of course, a reversed access sequence (i.e., "1" and then "0") can also be implemented.

In the above described embodiments, if the access sequence is correct, the access control unit 10 generates a signal after the second access which is fed to input 3*a* of timer 3 and which resets the timer 3. Then, timer 3 reloads the value stored in bit field 2*a* of control register 2 and starts counting up or down according to its control values stored in control register 2*c*.

Figure 3:
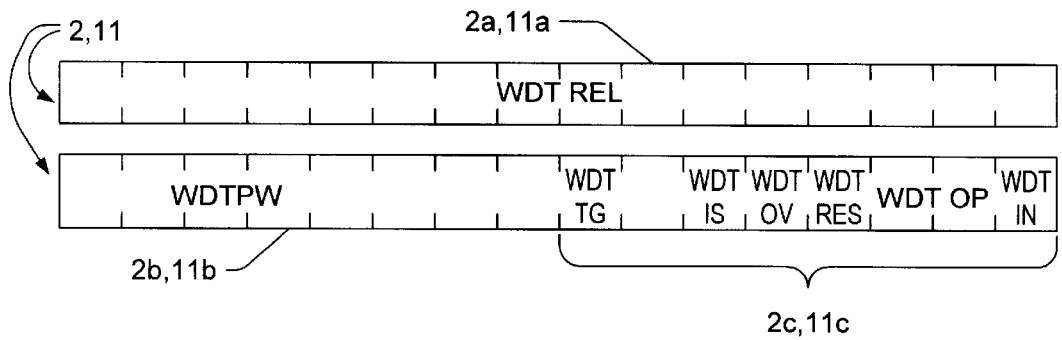
FIG. 3 shows the structure of a control register according to FIG. 1 and FIG. 2.

FIG. 3 shows the content of the control register 2 and the shadow register 11. In this embodiment, it is assumed that the control register is 32 bits wide.

WDTREL—these 16 bits represent the reload value 2*a* or 11*a* for the watchdog timer.

WDTPW—this 8 bit wide bit field 2*b* or 11*b* represents the password value for the watchdog timer.

The control bit field 2*c* or 11*c* contains the following bits:

WDTTG—represents the toggle bit. This bit must be written to "0" with the first access and written to "1" with the second access to the control register 2, WDTIS—represents the watchdog timer incorrect service flag. This flag is set if the watchdog error was caused by an incorrect service sequence.

WDTOV—represents the watchdog timer overflow flag and is set if the watchdog error was caused by an overflow.

WDTRES—represents the watchdog timer reset control. This bit determines whether the signal generated by comparator 4 is fed to terminal 6 or fed to the reset input of CPU 1.

WDTOP—represents the watchdog timer operation control. These two bits can be set to four different values and indicate four different modes. A first mode indicates the watchdog timer operation, a second mode indicates a period timer operation, a third mode indicates a watchdog timer disable function and a fourth mode indicates an illegal operation which leads to activation of a reset signal.

WDTIN—represents a watchdog timer input frequency selection. In this embodiment this bit allows for two different frequencies. In a first mode, the frequency/clock signal 13 is divided by 128 in the clock control unit 7, and in the second mode, the clock signal 13 is fed directly to timer 3.

Figure 4:
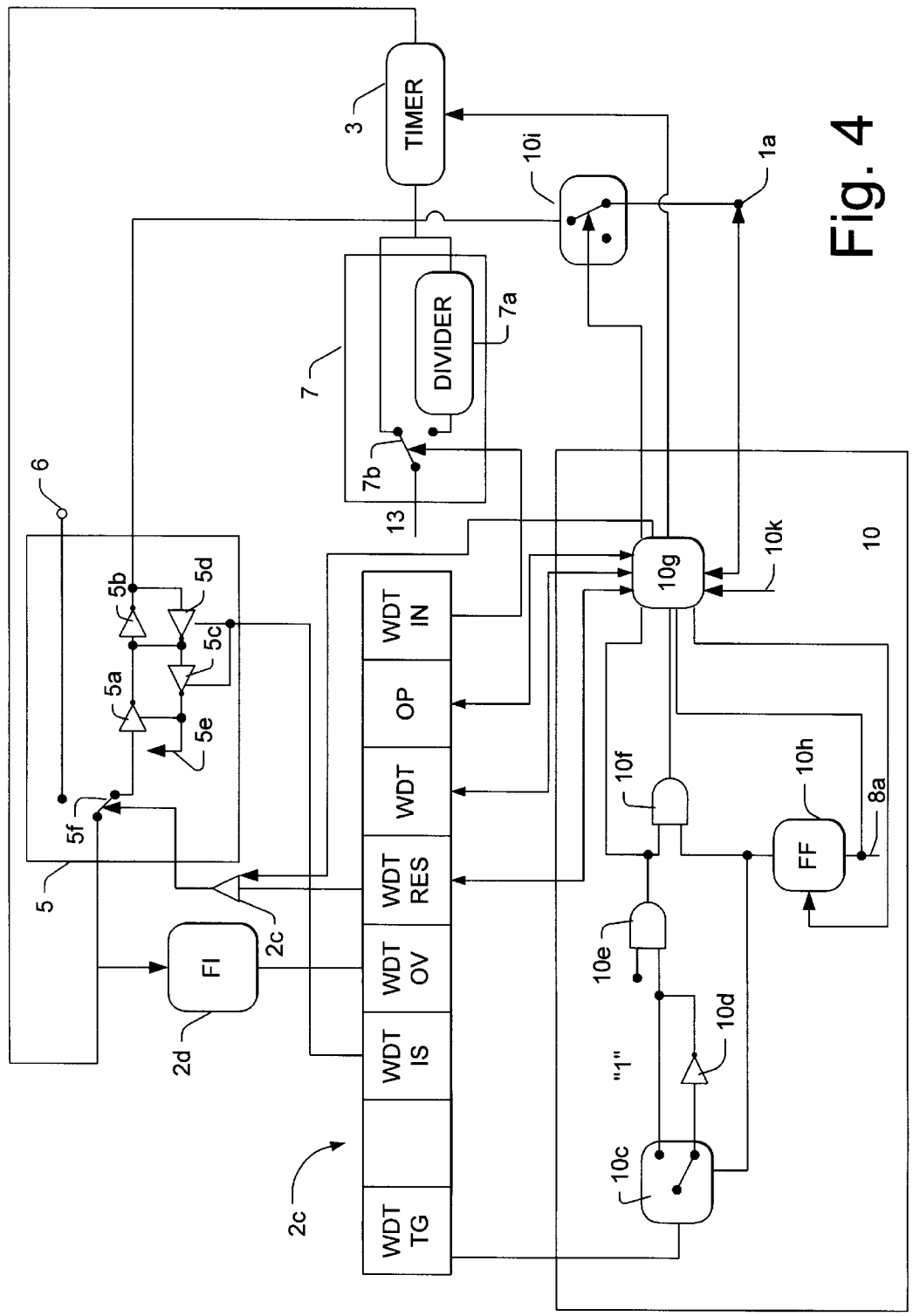
FIG. 4 shows an embodiment of units 5, 7 and 10 according to FIGS. 1 and 2.

FIG. 4 shows a block diagram including control bit field 2c of control register 2 and the associated units 5, 7 and 10 in more detail. Unit 10 comprises, for example, a controllable switch 10c whose input is coupled with bit WDTTG. One output of switch 10c is connected to a first input of an AND gate 10e. The other input of AND gate 10e is connected to a constant 1. The other output of switch 10c is coupled with the first input of AND gate 10e through an inverter 10d. The output of AND gate 10e is connected to a first input of a further AND gate 10f whose second input is connected to the output of a flip-flop 10h. The output of flip-flop 10h is also connected to the control input of switch 10c. Furthermore, the output of AND gate 10e is connected to a further control unit 10g provided in access control unit 10. Flip-flop 10h can be reset by unit 10g. The comparator output signal 8a is on one hand fed to the input of flip-flop 10h and on the other hand to control unit 10g. Control unit 10g is coupled with bit WDTRES to read and write this flag. Bits WDTOP are also connected to control unit 10g. Control unit 10g provides a first output signal which controls a driver 2e. The input of driver 2e is connected to bit WDTRES. The output of driver 2e controls a controllable switch 5f provided in mode control unit 5. A flip-flop 2d is provided whose input is connected to the overflow output of timer 3. The output of flip-flop 2d is connected to bit WDTOV.

Furthermore, the overflow output of timer 3 is connected to the input of controllable switch 5f. The first output of controllable switch 5f is connected to terminal 6. The second output of controllable switch 5f is connected to the input of a controllable inverter 5a whose output is connected to the input of an inverter 5b. The output of inverter 5b is coupled to the input of a further controllable switch 10i. The output of inverter 5b is also connected to the input of a controllable inverter 5d. The output of inverter 5d is connected on one hand to the input of inverter 5b and on the other hand to the input of a controllable inverter 5c. The output of controllable inverter 5c is connected to the control input of inverter 5a. Pull-up means 5e are provided which keep the control input of inverter 5a activated if inverter 5c is deactivated. Both control inputs of inverter 5d and inverter 5c are coupled with bit WDTIS of bit field 2c.

Clock control unit 7 comprises a controllable switch 7b which is controlled by bit WDTIN of bit field 2c. The input of controllable switch 7b is connected to clock signal 13. The first output of switch 7b is connected to the input of timer 3 and the second output of switch 7b is connected to the input of a divider 7a whose output is also connected to the input of timer 3. The control input of controllable switch 10i is controlled by a signal provided by unit 10g. The first output of switch 10i is connected to the reset input 1a of CPU 1. Unit 10g provides further input and output means which are connected to the first output of controllable switch 10i.

During a first access, the input of bit WDTTG is set to "0." Therefore, switch 10c feeds this signal through an inverter 10d to AND gate 10e. If this bit WDTTG is set to "0," AND gate 10e indicates this to control unit 10g. If the first access was correct, control unit 10g generates a signal which is fed to flip-flop 10h and switches controllable switch 10c to the second output and provides a constant "1" at the second input of AND gate 10f. During a second access, AND gate 10e now compares bit WDTTG directly with "1" and produces an output signal which is compared by AND gate 10f and fed to control unit 10g.

Control unit 10g is fed with a signal 10k which can be produced by a timer or by CPU 1. This signal 10k indicates a special time window which is opened after a reset has occurred. During this time window, control unit 10g allows a change of the control bits WDTRES and WDTOP. Furthermore, control unit 10g contains means which reset flip-flop 10h after a successful watchdog timer service. Control unit 10g also deactivates driver 2e after the time window has been closed. This prevents switch 5f of mode control unit 5 from switching into a position where the overflow signal is fed to terminal 6.

Disabling the watchdog timer is one of the most critical functions. The disable operation must be made such that it is nearly impossible for it to happen unintentionally. Therefore, the access control unit 10 comprises means 10g which ensure that the watchdog timer can only be disabled after a hardware reset during the watchdog timer initialization phase. A signal 10k, for example, generated by the CPU 1 or a timer triggered by the reset signal, is therefore fed to unit 10g. In this arrangement, disabling is done by writing the WDTOP bits to the binary value 11 after unlocking the control register 2. The effect of this operation is that the watchdog timer 3 is cleared to zero and the count clock, including the divider chain, is shut off to save power by means of unit 10g. From this condition, the watchdog timer 3 can be reactivated again with the correct watchdog timer service sequence. This will also be the case if severe disturbances due to, for example, electromagnetic influences have altered the internal control of the watchdog timer 3 such that it appears to be disabled. A following service sequence will re-enable the watchdog timer 3 again. In this embodiment, if the watchdog timer 3 has not been disabled during the initialization phase, it is not possible to disable the watchdog timer 3. An attempt to do so will lead to a reset signal generated by access control unit 10.

The watchdog timer 3 can be a 16 bit up or down counter which can be clocked with either the clock signal 13 or the clock signal 13 divided by 128. If more control bits are available in control bit field 2c, the clock signal 13 can be divided by another value and/or by a plurality of values. The watchdog timer 3 can be preset to a user programmable value represented in bit field 2a or 11a in order to vary the watchdog time-out time.

To prevent the watchdog timer 3 from overflowing, it must be serviced periodically by the user software. A service of watchdog timer 3 is performed by writing to control register 2 using the password mechanism described above. The first access writes the password 2b while the toggle bit WDTTG is set to "1" only during the second access. In addition, the access control unit 10 can provide additional security by comparing the two bits WDTOP and the bit WDTRES during the second access. These bits should have the same value selected during the watchdog timer initialization phase. During the second access, the password field WDTPW may be changed and also the reload value WDTREL may be changed. It is also possible to clear the flags indicating that a reset has been generated by a malfunction and to change the input clock selection control bit WDTIN.

An additional feature of the present invention is provided by mode control unit 5. This feature is only available if the mode control unit 5 is programmed to generate a reset signal which is fed to reset input 1a of CPU 1. If the watchdog timer overflows once, the bit WDTOV in control bit field 2c is set. If the watchdog timer overflows a second time without the overflow flag WDTOV being cleared, for example, if it is still set from the previous overflow, a reset is generated by mode control unit 5 and this state is held in reset until an external reset or power-up reset occurs. If bit WDTIS is "0", drivers 5c and 5d are deactivated. Control input of driver 5a is held active through the pull up 5e. In this state, every reset generated by timer 3 is fed directly to input 1a through switch 5f, drivers 5a and 5b and switch 10i. If bit WDTIS is set to "1" due to a timer overflow, drivers 5c and 5d are activated. Driver 5a remains active. Thus, whenever a timer overflow is generated, driver 5a will be deactivated, and drivers 5b and 5d hold the reset until a hardware reset resets the whole arrangement. The condition described is the case where no code can be executed. Even the initialization routine does not execute, since the overflow flag was not accessed and cleared. In order to prevent the part from executing random wrong code and being reset by the watchdog timer 3 over and over again, this feature is implemented to lock the part in reset mode in such a case.

Figure 5:
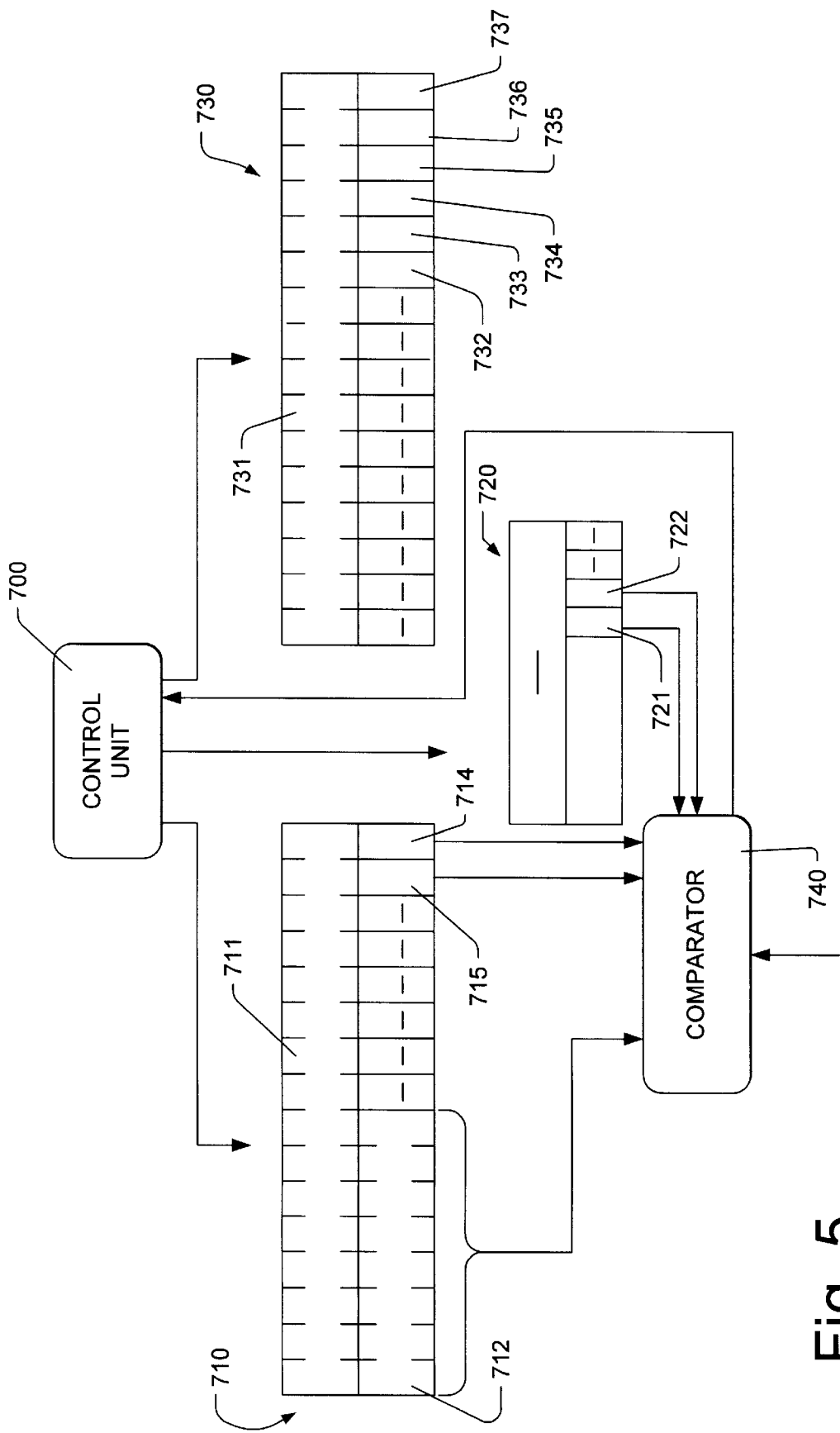
FIG. 5 shows relevant parts of a further embodiment of the present invention.

Another preferred embodiment of the present invention is shown in FIG. 5. this drawing shows only the associated registers, the control unit and the comparator for the benefit of a better overview. The control register consists of three separate 32-Bit registers 710, 720, and 730. A control unit 700 controls reading and writing to the registers and a comparator 740 provides the control unit 700 with information whether an access to the registers will be granted or not.

The first register 710 contains the following bits:

Numeral 711 depicts 16 bits which contain the reload value for the watchdog timer. If the watchdog timer is enabled, it will start counting from this value after a correct watchdog service. It must be written with the same value during a password access. It can be modified during a modify access to register 710.

Numeral 712 depicts 8 bits which contain the user-definable password field for access to register 710. It must be written with the same value during a password access. It can be modified during a modify access to register 710.

Numeral 713 depicts a single bit which contains a lock bit used to control access to register 710. This bit must be written to 0 during the password access to register 710 and written to 1 during the modify access to register 710 (i.e. always the inverted value of bit 713 must be written to this bit). This bit 713 is controlled by hardware and is cleared after a successful password access to register 710 and automatically set again after a successful modify access to register 710. The value written to this bit location is only used for the protection mechanism and is not stored.

Bit 713=0: Register 710 is unlocked.

Bit 713=1: Register 710 is locked.

Bit 714 depicts another single bit which represents a End-of-Initialization control bit. It controls the access to critical system registers. It must be written with the same value during a password access. It can be modified during a modify access to register 710.

The other bits in register 710 are reserved. They always read as 0. Writes to these bit locations have no effect.

The second register 720 contains the following bits:

Numeral 721 depicts a single bit which represents a Watchdog timer disable request control bit.

Bit 721=0: request to enable the watchdog timer.

Bit 721=1: request to disable the watchdog timer.

This bit can only be modified if bit 714 of register 710 is set to 0. An update of this bit will only go into effect if bit 714 of register 710 is set to one again. As long as bit 714 is 0, bit 734 in register 730 controls the current enable/disable status of the watchdog timer. When bit 714 is set to one, bit 734 is updated with the state of bit 721.

Numeral 722 depicts another single bit which represents the watchdog timer input frequency request control bit.

Bit 722=0: request to set input frequency to the system clock/16384.

Bit 722=1: request to set input frequency to the system clock/256.

This bit can only be modified if bit 714 of register 710 is set to 0. An update of this bit will only go into effect if bit 714 is set to one again. As long as bit 714 is 0, bit 735 in register 730 controls the current input frequency of the watchdog timer. When 714 is set to one, 735 is updated with the state of bit 722.

The other bits in register 720 are reserved. They always read as 0. Writes to these bit locations have no effect.

The third register 730 contains the following bits:

Numeral 731 depict 16 bits which reflect the current contents of the watchdog timer.

Numeral 732 is a single bit which represents a watchdog reset pre-warning flag.

Bit 732=0: normal mode (default after reset).

Bit 732=1: A watchdog error has occurred. The watchdog has issued an non-maskable interrupt (NMI) and is in the final time-out phase (Bit 733 is also set in this case). A reset of the chip will occur after the time-out has expired. This bit can be examined in the NMI trap routine to determine the cause of the trap. Bit 732 is cleared only through a reset.

Numeral 733 depicts a single bit which represents a watchdog time-out period indication flag.

Bit 733=0: normal mode.

Bit 733=1: the watchdog is operating in time-out mode (default after reset). Time-out mode is entered automatically after a reset and after the first password access to register 710 or when a watchdog error is detected. Time-out mode is terminated only in a non-error case with a modify access to register 710 writing bit 714 to one. After termination of the time-out mode, bit 733 is cleared through hardware. If time-out mode is entered due to a watchdog error, this mode cannot be terminated until the watchdog reset occurs.

Numeral 734 depicts another single bit which represents a watchdog enable/disable bit.

Bit 734=0: watchdog timer is enabled (default after reset).

Bit 734=1: watchdog timer is disabled.

This bit is updated with the state of bit 721 of register 720 after ENDINIT is written to one during a modify access to register 710.

Numeral 735 depicts a further single bit which represents a watchdog input clock status bit.

Bit 735=0: watchdog timer input clock is system clock/ 16384 (default after reset).

Bit 735=1: watchdog timer input clock is system clock/ 256.

This bit is updated with the state of bit 722 of register 720 after bit 714 of register 710 is written to one during a modify access to register 710.

Numeral 736 depicts a further single bit which represents a watchdog overflow error status flag.

Bit 736=0: no watchdog overflow error.

Bit 736=1: an watchdog overflow error has occurred.

This bit is set by hardware when the watchdog timer is enabled and is not serviced before the overflow from 0xFFFF to 0x0000 occurs, or if the watchdog timer is in time-out mode and the overflow occurs. This bit is only reset through a power-on, hardware or software reset;

after bit 714 is written to one during a modify access to register 710 (not possible if watchdog is in the reset pre-warning phase, bit 732=1).

Numeral 737 depicts another single bit which represents a watchdog access error status flag.

Bit 737=0: no watchdog access error.

Bit 737=1: an watchdog access error has occurred.

This bit is set by hardware when an illegal access to register 710 was attempted (either a password or modifying access). This bit is only reset through a power-on, hardware or software reset;

after bit 714 is written to one during a modify access to register 710 (not possible if watchdog is in the reset pre-warning phase, bit 732=1).

The other bits in register 730 are reserved. They always read as 0. Writes to these bit locations have no effect.

Register 730 is a read-only register and can be read at any time. Write accesses to this register will have no effect (no error is reported in such a case). Updating of the status bits in register 730 is handled automatically in hardware. The two error flags, 736 and 737, are not cleared through a watchdog reset (but through any other reset). They are cleared with a successful access to register 710 which writes bit 714 to one. Register 720 can also be read at any time without any restrictions. Writing to this register is only possible if bit 714 of register 710 is cleared to 0 (register 720 is bit 714-protected). Updates made to the bits in this register will go into effect after bit 714 has been set to one again. Register 710 can also be read at any time without any restrictions. Writing to this register, however, requires a special sequence.

A proper access to register 710 is always comprised of two write accesses. A first "password access" to unlock register 710, and a second "modifying access" to affect the operation of the watch-dog and to lock register 710 again. Note that, even in the case no parameters are changed in the second write access, the term "modifying access" is used for this.

Register 710 is locked against modifications through a special password protection. The locked status of register 710 is reflected by bit 713. To modify register 710, it must be unlocked first through a password.

The password required to unlock register 710 is comprised of the state of bits in register 710 and register 720. Due to the requirements for password bits 714 and bits 712, the password can never be determined just by reading the contents of one of the watchdog registers. It always requires a modifying step to alter some of the bits in order to get the right password. This password has to be written to the address location of register 710 in order to unlock this register for modifications. If the password matches the requirements, register 710 will be unlocked after this write operation has finished. This unlocked condition is indicated by bit 713=0. The comparison of the actual access code with the stored content of register 710 and 720 is performed by comparator 740 in combination with control unit 700. Now register 710 is open for modifications for one following write access to register 710.

After this write has finished, register 710 is automatically locked again by means of control unit 700. Bit 713 is set to one by control unit 700. If the password value written to register 710 during the unlock access does not match the contents of register 710, a watchdog access error situation exists. The watchdog error situations are disclosed further below.

An 8-bit field 712 in register 710 can be set by the user to any arbitrary value (if register 710 is unlocked). This field is solely used for the password mechanism, it does not have any further effect on the operation of the watchdog. By changing this field every time register 710 is accessed, the sequence of accesses to register 710 can be monitored during the execution of a program.

During the modifying access, for example, the only strict requirement can be that bit 714 and the reserved bits 7:4 are written to one and the reserved bits 3:2 are written to 0. All other bits can be set to user-definable values. If the value written to register 710 during the modifying access does not match these requirements, a watchdog access error exists. The watchdog error situations are detailed described further below.

The watchdog timer can either be used in an application, with its highly reliable and secure watch-dog function, or it can be disabled. The principle of accessing a peripheral device, such as a watchdog, is applicable for any other device. After any reset, the watchdog timer can operates in time-out mode The register contents are as follows:

register710 [31:16]  0000 0000 0000 0000
         [15:0]   0000 0000 0000 0010 reload value and password are both 0; register 710 is locked (bit 713=1); bit 714 is reset, access to protected register is open.

register720 [31:16]  0000 0000 0000 0000
         [15:0]   0000 0000 0000 0000 watchdog timer enable request set; input clock request set to system clock/16384.

register730 [31:16]  1111 1111 1111 1100
         [15:0]   0000 0000 0001 00xx watchdog timer contains FFFC (initial time-out value); watchdog is operating in time-out mode (bit 733=1); watchdog timer is enabled; input clock is system clock/16384. Bits 736 and 737 are 0 after a power-on, hardware or software reset. In case of a watchdog reset, these two bits are set depending on the error condition which caused the watchdog reset.

The watchdog timer is automatically set to time-out mode on one of the following conditions:

always after a reset always after a password access to register 710 (if the watchdog is not already in time-out mode)

Time-out mode is indicated through bit 733=1 in register 730. At the beginning of the time-out mode, the watchdog timer is set to 0xFFFC and is enabled (bit 734 is not updated in this case, even if the watchdog timer was disabled with bit 734=1). The watchdog timer is counting up from this value with the input clock determined through bit 735. This gives a time-out period of either 1024 clocks or 65536 clocks. After reset, the time-out period always is 65536 clocks. To stop the time-out mode, bit 714 in register 710 has to be written to one with a modifying access. This access stops the time-out, resets bit 733, and switches the watchdog timer back to the operation determined through the control bits 734, 735, and 711. If bit 734=1, the watchdog timer is set to 0 and is stopped. If bit 734=0, the watchdog timer is set to the value of bit 711 and starts counting upwards with the clock input selected through bit 735.

If the time-out mode is not properly stopped, the watchdog timer will overflow from 0xFFFF to 0x0000 and will enter the reset pre-warning mode. In this mode, bits 736, 733 and 732 in register 730 are set, and an NMI trap request to the CPU is activated.

The reset pre-warning mode, indicated through bit 732=1, is similar to the time-out mode except that it is no longer possible to stop the time-out period. When the watchdog timer overflows from 0xFFFF to 0x0000, a watchdog timer reset will occur. This mode is intended to give software a chance to save important state, such as the PC, the stack pointer, and the context pointers of the current executing program in memory. After the reset, these memory locations can be examined in order to determine the possible root cause of the watchdog error. This is especially important during program debugging. In the NMI routine, a check of bit 732 should always be performed to distinguish the NMI trap cause from an external NMI request.

After a reset, bit 714 is cleared to 0, giving access to critical system registers protected via the bit 714. Register 720, used to control the operation of the watchdog timer, is one of the registers protected by bit 714. When changing the operation of the watchdog timer through the controls in register 720, these changes will have no immediate effect. They will go into effect only after bit 714 has been set to one again. In this way, changes of these bits do not interfere with the time-out operation of the watchdog timer. Since the watchdog timer is in the time-out mode after reset, there is a time limit of 65536 clocks on the initialization of the critical system registers. Bit 714 must be set to one before the time-out expires.

To set bit 714, the proper access sequence to register 710 has to be performed. In the first password access, the proper password value has to be written to the address of register 710. Note that while the initial values for bits 711 and bits 712 are zero, one has to take into account possible modifications made to the controls in register 720 for the determination of the required password. If no changes are performed to bits 721 and 722, the initial password value is 0000 0000 0000 0000 0000 0000 1111 0000. If bits 721 and 722 have been modified, bits 2 and 3 of the password value have to reflect the new state of these two bits. Now register 710 is unlocked (713=0), and the second modifying access to register 710 in order to set bit 714 can be performed. For this access, the only strict requirement can be that bit 713 of the value written to register 710 is one (the opposite value of the one used in the password access) and unused bits 7:4 are also written to one. Bits 711 and bits 712 both can be changed, but they don't have to be changed. Bit 714 can be written to one or zero, however, writing bit 714 to zero will not stop the time-out mode. Any values written to bits 711, 712 and 714 will be stored in register 710, and the register will automatically be locked after that write (bit 713=1). If bit 714 was written to one during the modifying access to register 710, the time-out mode is terminated. Bit 733 is cleared, bits 735 and 734 are updated with the values of bit 722 and 721, respectively, and the watchdog timer is switched to the operation determined through bit 735 and bit 734. Access to registers protected via bit 714 is prohibited (including register 720).

If system requirements are such that some or all of the control parameters have to be changed during run time of an application, access to the registers protected via bit 714 can be reopened. For this, register 710 has to be unlocked first with the proper password. In the second, modifying access, bit 714 can be cleared. Now access to the critical registers is open again. This open access window is again monitored via the watchdog time-out mode. With the first un-locking of register 710, the watchdog timer is switched to time-out mode. This mode will only be terminated after bit 714 has been set to one again, using a proper access sequence to register 710.

If the watchdog timer is used in an application and is therefore enabled (bit 734=0, default after reset), it has to be regularly serviced to prevent it from overflowing. A proper service is performed through the access sequence to register 710. First the proper pass-word has to be written to the register 710 location to unlock register 710. In the modifying access, the strict requirement is that bit 714 is written to one and that bit 714 and unused bits 7:4 are written to one. Changes to the reload value 711 or the user-definable password 712 are not required. Changing bits 712, however, is recommended in order to enable a monitoring of the watchdog timer service operations throughout an application program. In this embodiment, with the first password access to WDTCON0, the watchdog timer is switched to time-out mode. Thus, the second access has to be performed before the time-out expires. If this sequence is properly executed, the time-out is terminated, the watchdog timer is set to the reload value 711 and starts counting upwards with the input clock determined through bit 735. The watchdog timer service is complete.

Several conditions can lead to the generation of a watchdog error. An incorrect access error is generated in the case of an illegal password in the first password access to register 710, or a value of 0 in either bit 714 and unused bits 7:4 in the value written to register 710 in the modifying access.

A watchdog timer overflow error is generated in case of:

an overflow in time-out mode, or an overflow in watchdog timer mode.

In case of an access error, bit 737 in register 730 is set. If an overflow error occurs, bit 736 in register 730 is set. In any of the error cases, the watchdog generates an NMI trap request and enters the reset pre-warning phase. Bits 732 and 733 are both set.

If a watchdog error has occurred and another watchdog error occurs while one of the error indication flags 736 or 737 are still set, a reset is generated after the reset pre-warning phase and the part is held in reset until an external hardware or power-up reset occurs. The condition described is the case where no code can be executed, even the initialization routine does not execute, since the error flags were not accessed and cleared. In order to prevent the part from executing random wrong code and being reset by the watchdog timer over and over again, this feature is implemented to lock the part in reset mode in such a case.

There are two time-out periods for the watchdog. One is the predefined period in the watchdog time-out mode, the other the user-selectable period in the true watchdog timer operation.

The predefined period in the time-out mode is only modifiable through the selection of the input clock; the initial count value for the timer is fixed to 0xFFFC, that is, the timer counts four input clocks until the overflow. In the first time-out phase directly after reset, also the input clock is fixed to system clock (SYSCLK) divided by 16384. Changing the input frequency selection via bit 722 in register 720 will only go into effect after 714 has been set to one, that is, after the time-out mode has been properly finished.

The possible periods in time-out mode are for example:
bit 735=0: PER(time-out)=4*16384/SYSCLK=65536/ SYSCLK (655.36 ms/65536 instructions cycles @100 MHz); initial time-out period after reset.
bit 735=1: PER(time-out)=4*256/SYSCLK=1024/SYSCLK (10.24 ms/1024 instr. cycles @100 MHz).

The time-out period in watchdog timer mode can be varied by two parameters: the input clock and the reload value. For the input clock, either the system clock SYSCLK divided by 256 or divided by 16384 can be selected. The selection is made via bit 735 in register 710. The default after reset is that 735=0, thus selecting the frequency SYSCLK/16384. Each time the watchdog timer is serviced, it is reloaded with the value stored in the upper 16 bits of register 710. With this, the time-out can be varied in a wide range. The maximum time period of the watchdog timer is determined through (bits 711=0000h):
PER(SYSCLK/256)=65536*256/SYSCLK (167.7 ms/16.77 mill. instr. cycles @100 MHz)
PER(SYSCLK/16384)=65536*16384/SYSCLK (10.73 s/1.073 billion instr. cycles @100 MHz)

The minimum time period of the watchdog timer is determined through (bits 711=FFFFh):
PER(SYSCLK/256)=1*256/SYSCLK (2.56 ms/256 instruction cycles @100 MHz)
PER(SYSCLK/16384)=1*16384/SYSCLK (163.84 ms/16384 instr. cycles @100 MHz)

The general form with variable reload value 711 for these calculations is:
PER=(2 16−<WDTREL>) *256*2 (1−<WDTIC>)*6/ SYSCLK Normally, an embedded application program is built around a loop of routines which are repeatedly executed. For example, after a reset and initialization routine, a plurality of subroutines may be executed sequentially over and over again. Besides this main loop, there is a set of interrupt service routines. The watchdog timer service sequences are embedded within the loop of the main program. Watchdog timer sequences are preferably placed within the user software such that a safe service before the next overflow is guaranteed. This is preferable even if the duration of execution of the different portions of the code usually varies, especially in embedded control applications. The service should normally be performed in the main routine. Placing the service sequence into an interrupt routine, invoked through a periodic timer, could have the problem that even if the main program goes awry, the interrupt program with the watchdog service sequence might still be executed properly, thus disabling the intended monitoring function of the watchdog timer 3.

Figure 6:
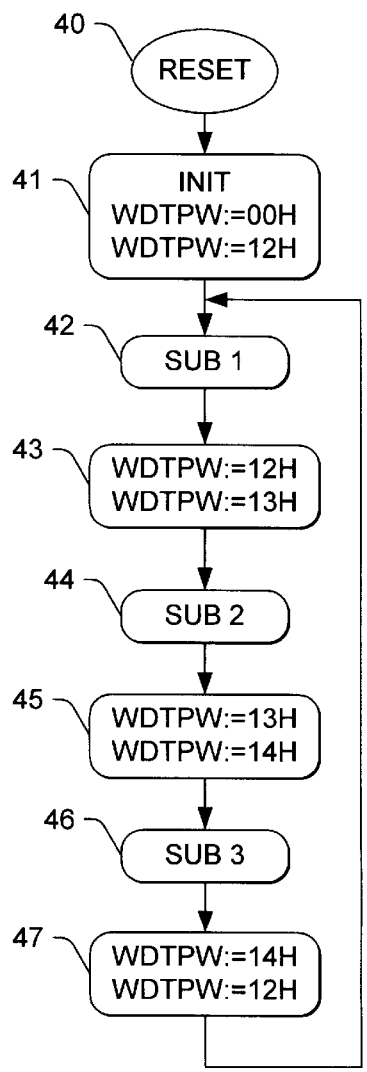
FIG. 6 shows a flowchart showing a method of monitoring a program according to the present invention.

According to the present invention, with a watchdog timer according to one of the embodiments described above, there are different possibilities of how to handle these watchdog services. The following two examples describe how to handle watchdog services comprising a high security. FIG. 6 shows a first sample program. After a reset in step 40, the watchdog timer is initialized in step 41. Also in step 41, the watchdog timer is serviced the first time. Therefore, a first access to the service register 2 with a watchdog password of zero is done. During the second access, the password is set to a new value, for example, "12." The following steps 42 to 47 form the main loop body of the main program. In step 42, a first subroutine Sub1 is executed. In the following step 43, the value of the watchdog timer password is set to a new value, for example, "13". In step 44, a second subroutine Sub2 is executed. Step 45 again changes the watchdog timer password from "13" to "14." With step 46, a third subroutine Sub3 follows. In the last step 47 of the loop body, the password is set back from "14" to "12," and the program jumps to step 42.

Since at the beginning of each sequence, the old password is first written to the control register 2, a link to the previous service is performed. If, due to an error, one or more of the service sequences are skipped, the control register 2 will not contain the expected value at the beginning of the next service sequence. An immediate timeout will occur and the reset signal 1a is activated. This will also happen if a service sequence is executed twice due to an erroneous loop. With this scheme, the service sequences must be placed at points in the code which are always executed during the main loop.

Figure 7:
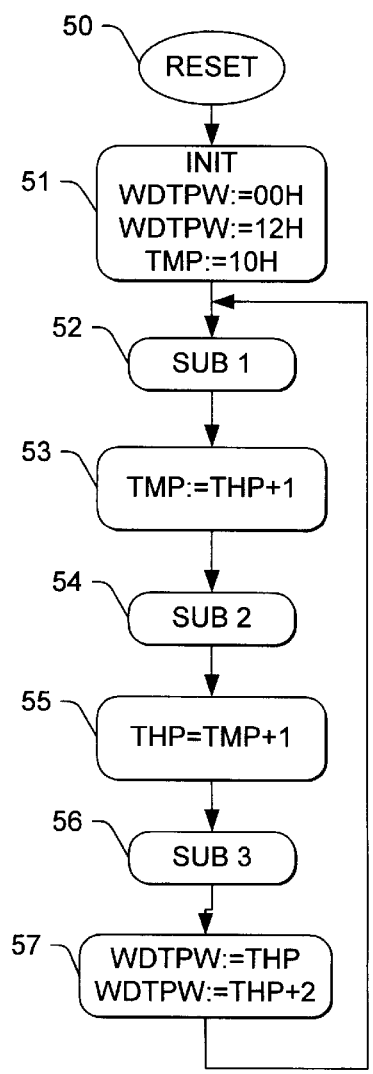
FIG. 7 shows a flowchart showing a second method of monitoring a program according to the present invention.

FIG. 7 shows another example of a program containing watchdog services. After a reset in step 50, the watchdog timer is initialized in step 51. Also, the watchdog password is set from "0" to "12" during this step, and a memory cell TMP is set to ten. During execution of the main loop body, a first subroutine Sub1 is executed in step 52. During the following step 53, the content of the memory cell TMP is incremented by one. Step 54 follows with execution of subroutine Sub2. During the next step 55, the content of the memory cell TMP is again incremented by one. Step 56 follows with execution of subroutine Sub3. Finally, a watchdog timer service follows, during which the password is changed to the content of memory cell TMP plus two.

This example shows another way thereby placing only one watchdog service sequence inside the program, normally at the end of the main loop. Again, monitoring of the program flow can be achieved by using a temporary variable, here stored in memory cell TMP. This memory cell TMP is modified appropriately at different points during the code execution. In the shown example, the content of the password in control register 2 is modified by a function during step 51. Steps 53 and 55 revert this function, so that the variable stored in memory cell TMP contains the original password at the end of the loop in step 57. If everything was done right, the memory cell TMP exactly matches the password value in control register 2. However, if one or several checkpoints in the code have been missed due to failures, memory cell TMP does not contain the correct value and an early watchdog time-out will be generated, activating the reset signal 1a. The function executed in step 51 and the reverse functions executed in steps 53 and 55 can be different operations. The shown example shows a subtraction of 2 in step 51 and two additions of 1 in steps 53 and 55. Of course, any other arithmetic or logical function can be executed. For example, the password contained in control register 2 can be rotated a number of times leftwards. During execution of the main loop body at several points, a rotation rightwards has to be executed to match the password contained in control register 2 at the end of the main loop body. It is essential, that the different functions executed during the main loop body neutralize the function made in step 51.

Figure 8:
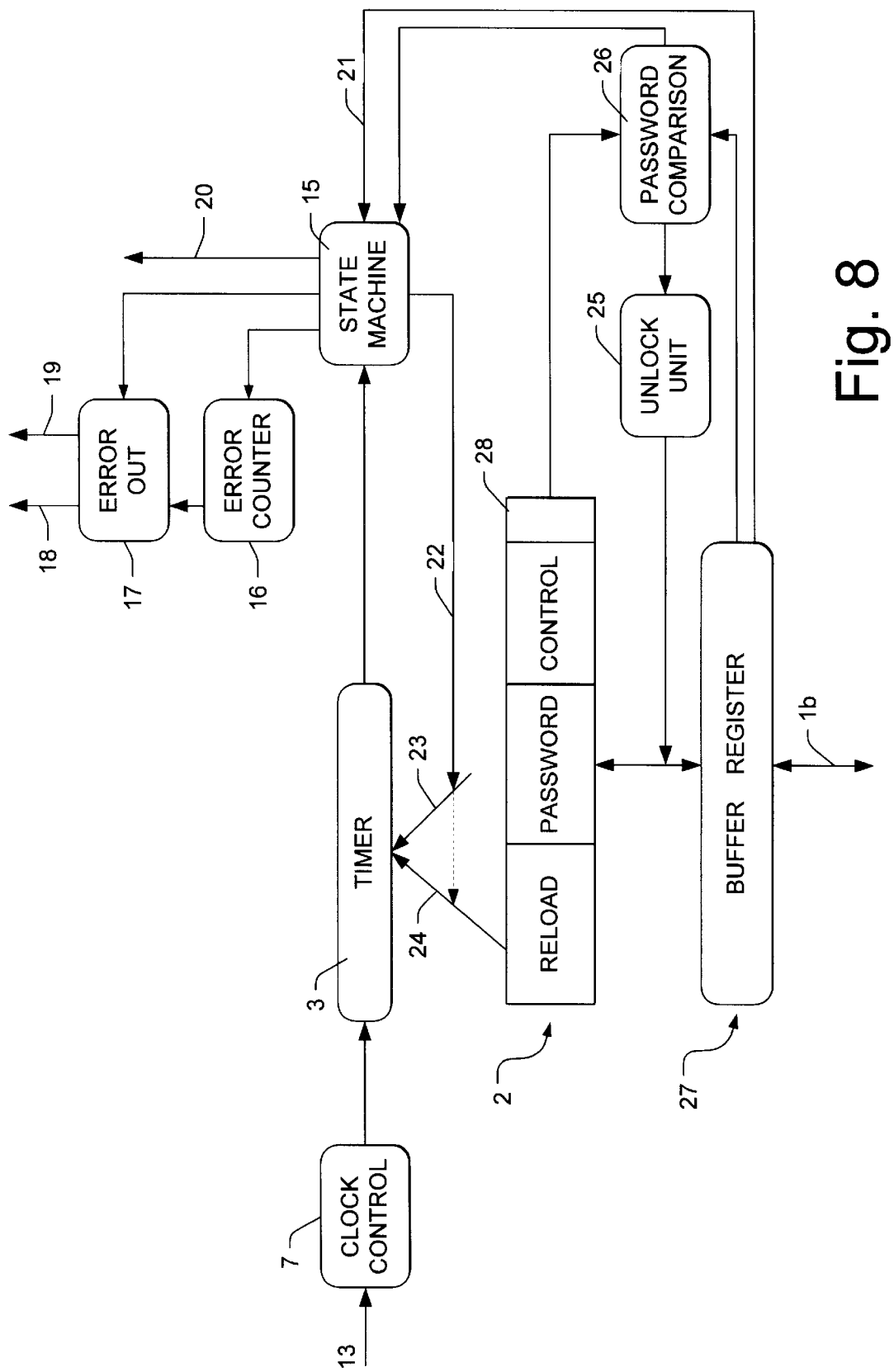
FIG. 8 shows a block diagram of a third preferred embodiment according to the present invention.

FIG. 8 shows another embodiment according to the present invention which constitutes a watchdog timer peripheral. The same numerals from FIGS. 1 and 2 indicate the same elements in FIG. 8. the embodiment shown in FIG. 8 is a variation of that shown in FIG. 2. In this embodiment a state machine 15 is used as a access control unit. State machine 15 generates all necessary signals to control timer 3. An error counter 16 is provided which is controlled by the state machine 15. Further, an error output unit 17 is provided which receives input signals from error counter 16 and state machine 15. Error output unit 17 generates two signals 18 and 19. Signal 18 indicates a double overflow of timer 3. Signal 19 indicates a watchdog error. State machine 15 can also generate a pre-warning signal 20. State machine 15 further generates all necessary control signals 22 to reset/restart or stop timer 3. Signal 24 is the reload value from register 2 and signal 23 a predefined start value generated from the state machine 15. A buffer register 27 provides the same function as shadow register 11 according to FIG. 2. A password comparison unit 26 is provided to compare register 2 and register 27. To allow transfer of data from buffer register 27 to register 2 a unlock unit 25 is provided which controls the signal flow between the two registers. The control filed of register 2 comprises a special bit 28 which indicates the end of initialization of the watchdog timer registers.

Timer 3 can be a 16 bit watchdog timer which is controlled by clock control unit 7. Clock control unit 7 is programmable and divides an input clock 13 fed to clock control unit 7. Again, register 2 comprises a reload portion, a password portion and a control portion. Bit 28 of the control portion is used to write protect critical functions of the watchdog timer. In addition, it can be used to write protect critical functions of any register in a microprocessor system. Once this bit has been set to allow writing of these registers state machine 15 resets timer 3 into a watchdog mode and provides it with a predefined start value 23. The timer starts running and will generate a reset signal if control bit 28 has not been reset before timer 3 overflows. thus, a time window is generated in-between which all necessary register alterations have to be executed. This time window signal is similar to signal 10k described with FIG. 4.

Instead of only comparing the password portion of registers 2 and 27, in this embodiment the completed content of registers 2 and 27 are compared. Password comparison unit 26 therefore compares both registers 2 and 27, whereby some bits of the control portion maybe excluded or have to be inverted, etc. In a second access all or part of register 2 may be overwritten with new values. Comparison unit 26 may also provide a comparison of some bits in the control portion during the second access. The access to register 2 is controlled by the state machine 15 which receives a write access signal 21 from buffer register 27 and all necessary signals from the password comparison unit 26. Error output unit 17 generates watchdog error signal 19 if a false access has been detected. It also generates a double overflow signal 18 which is indicated by error counter 16 which counts the overflows from timer 3.

In all embodiments the reset generated by the error mechanism of the timer 2 may be replaced by the following steps. Instead of generating a reset signal because a critical error occurred a non maskable interrupt or a warning signal is generated which is fed to the central processing unit. In addition, timer 3 is set into watchdog mode which cannot be stopped. In this watchdog mode the preset value 23 is used and the timer is started. Thus, central processing unit is allowed to capture and save critical data. The overflow of timer 3 then generates a reset signal. The non maskable interrupt is shown as the pre-warning signal 20 in FIG. 8.

What is claimed is:

1. An integrated peripheral device comprising an associated register, said register comprising at least a data area containing a password, said register being connected to a read/write control unit, said read/write control unit generating an enabling signal after a first access which allows a data word to be written to said register during a following second write access, whereby said read/write control unit comprises a comparator which compares at least a password in said data transmitted to said peripheral device during a first access with said store d password and generates a comparison signal, said read/write control unit only generates said enabling signal if said comparator generates a predefined comparison signal.

2. Peripheral device according to claim 1, wherein said read/write control unit further comprises a access control unit and a controllable gate, said data during said second access being fed to said controllable gate and said access unit, said controllable gate transferring said data to said register if said enabling signal is fed to said gate.

3. Peripheral device according to claim 2, wherein said access control unit being connected to at least one further bit of said register and writing said bit during the first access according to a corresponding bit contained in said data word, said access control unit comprises a second comparator connected to said register which compares said bit of said register with a corresponding bit in said data word during said second access, said comparator generating a comparison signal, said enabling signal being generated upon this comparison signal.

4. Peripheral device according to claim 3, wherein said comparison signal indicates, that said bit during the first access has to be set to a first binary value and during the second access to the inverted binary value.

5. Peripheral device according to claim 1, wherein said read/write control unit further comprises a shadow register having the same size as the associated register being writeable, wherein said access control unit is connected to both registers and said comparator comparing the data area containing the password of both registers, wherein said access control unit transfers upon said enabling signal the data written to said shadow register during said second access into said associated register.

6. Peripheral device according to claim 5, wherein said access control unit being connected to at least one further bit of said register and writing said bit during the first access according to a corresponding bit contained in said shadow register, said access control unit comprises a second comparator connected to said register which compares said bit of said associated register with a corresponding bit in said shadow register during said second access, said comparator generating a comparison signal, said enabling signal being generated upon this comparison signal.

7. Peripheral device according to claim 6, wherein said comparison signal indicates that said bit during the first access has to be set to a first binary value and during the second access to the inverted binary value.

8. Peripheral device according to claim 1, wherein said peripheral device comprises a further register which can only be written if said enabling signal has been generated.

9. A data processor comprising a watchdog timer having an associated register, said register comprising a data area containing a password, said register being connected to a read/write control unit connected to said data processor, said read/write control unit generating an enabling signal after a first access which allows the data processor to write a data word into said register during a following second write access, whereby said read/write control unit comprises a comparator which compares data transmitted by said data processor to said peripheral device during a first access with said password and generates a comparison signal, said read/write control unit only generates said enabling signal if said comparator generates a predefined comparison signal.

10. Watchdog timer according to claim 9, wherein said read/write control unit further comprises an access control unit and a controllable gate connected to said data processor, said data being fed to said controllable gate and said access unit during said second access, said controllable gate transferring said data to said register if said enabling signal is fed to said gate.

11. Watchdog timer according to claim 10, wherein said access control unit being connected to at least one further bit of said register and writing said bit during the first access according to a corresponding bit contained in said data word, said access control unit comprises a second comparator connected to said register which compares said bit of said register with a corresponding bit in said data word during said second access, said comparator generating a comparison signal, said enabling signal being generated upon this comparison signal.

12. Watchdog timer according to claim 11, wherein said comparison signal indicates that said bit during the first access has to be set to a first binary value and during the second access to the inverted binary value.

13. Watchdog timer according to claim 9, wherein said read/write control unit further comprises a shadow register connected to said data processor having the same size as the associated register, wherein said access control unit is connected to both registers and said comparator comparing the data areas containing the password of both registers, wherein said access control unit transfers upon said enabling signal the data written to said shadow register during said second access into said associated register.

14. Watchdog timer according to claim 13, wherein said access control unit being connected to at least one further bit of said register and writing said bit during the first access according to a corresponding bit contained in said shadow register, said access control unit comprises a second comparator connected to said register which compares said bit of said associated register with a corresponding bit in said shadow register during said second access, said comparator generating a comparison signal, said enabling signal being generated upon this comparison signal.

15. Watchdog timer according to claim 14, wherein said comparison signal indicates, that said bit during the first access has to be set to a first binary value and during the second access to the inverted binary value.

16. Watchdog timer according to claim 9, wherein said peripheral device comprises a further register which can only be written if said enabling signal has been generated.

17. Method to access an integrated peripheral device having an associated register, said register comprising at least a data area containing a password, said register being connected to a read/write control unit, said read/write control unit generating an enabling signal after a first access which allows a data word to be written to said register during a following second write access, the method comprising the steps of:

writing a first data word comprising at least said password to said peripheral device, said read/write unit comparing said password of said first data word with said stored password, and generating an enabling signal if said passwords meet a predefined condition, writing a second data word to said peripheral device, and storing said second data word in said register if said enabling signal has been generated.

18. Method according to claim 17, wherein said first data word contains at least one bit having a first binary value during step a) and storing said second data word only if said bit in said second data word has the inverted binary value of said bit in said first data word.

19. Method to access a watchdog timer having an associated register, said register comprising at least a data area containing a password, said register being connected to a read/write control unit, said read/write control unit generating an enabling signal after a first access which allows a data word to be written to said register during a following second write access to control a function of said watchdog timer, the method comprising the steps of:

writing a first data word comprising at least said password to said peripheral device, said read/write unit comparing said password of said first data word with said stored password, and generating an enabling signal if said passwords meet a predefined condition, writing a second data word to said peripheral device, and storing said second data word in said register if said enabling signal has been generated.

20. Method according to claim 19, wherein an exception signal is generated if at least on of the accesses is performed incorrectly.

21. Method according to claim 20, wherein the exception signal is an interrupt signal and wherein the watchdog timer is restarted with a predefined value.

22. Method according to claim 21, wherein said restarted watchdog timer cannot be reset.

23. Method according to claim 19, wherein after writing of at least one bit of said register the watchdog timer is restarted with a predefined value.

24. Method according to claim 23, wherein after resetting said bit said watchdog timer is stopped.

25. Method of monitoring a program being executed in a data processor having a watchdog timer having an associated register, said register comprising a data area containing a password, said register being connected to an read/write control unit connected to said data processor, said read/write control unit generating an enabling signal after a first access which allows the data processor to write a data word into said register during a following second write access, whereby said read/write control unit comprises a comparator which compares data transmitted by said data processor to said peripheral device during a first access with said password and generates a comparison signal, said read/write control unit only generates said enabling signal if said comparator generates a predefined comparison signal, the method comprising the steps of:

initializing said register with a first password, executing a subroutine, changing said password, and repeating steps b) to c) with different subroutines.

26. Method according to claim 25, further comprising the steps:

changing said password to said first password, and repeating steps b) to e).

27. Method of monitoring a program being executed in a data processor having a watchdog timer having an associated register, said register comprising a data area containing a password, said register being connected to an read/write control unit connected to said data processor, said read/write control unit generating an enabling signal after a first access which allows the data processor to write a data word into said register during a following second write access, whereby said read/write control unit comprises a comparator which compares data transmitted by said data processor to said peripheral device during a first access with said password and generates a comparison signal, said read/write control unit only generates said enabling signal if said comparator generates a predefined comparison signal, the method comprising the steps of:

initializing said register with a first password, changing said password by a first function and storing it in a data memory, changing said password at least once during executing of a program loop by a second function, wherein at the end of said program loop said password stored in said data memory is identical to said password stored in said register, changing said password stored in said register, and repeating steps b) through d).

28. Method according to claim 27, wherein said first function is an arithmetic function and said second function is a reverse arithmetic function.

29. Method according to claim 27, wherein said first function is a logical function and said second function is a reverse logical function.

\* \* \* \* \*